(12) United States Patent
Cobb

(10) Patent No.: US 8,444,272 B2
(45) Date of Patent: May 21, 2013

(54) MULTI-PROJECTOR SYSTEM USING MULTIPLEXED ILLUMINATION

(75) Inventor: Joshua Monroe Cobb, Victor, NY (US)

(73) Assignee: Corning Incorporated, Corning, NY (US)

( * ) Notice: Subject to any disclaimer, the term of this patent is extended or adjusted under 35 U.S.C. 154(b) by 302 days.

(21) Appl. No.: 12/972,752

(22) Filed: Dec. 20, 2010

(65) Prior Publication Data

US 2011/0181840 A1  Jul. 28, 2011

Related U.S. Application Data

(60) Provisional application No. 61/297,985, filed on Jan. 25, 2010.

(51) Int. Cl.
| | |
|---|---|
| *G03B 21/26* | (2006.01) |
| *G02F 1/00* | (2006.01) |
| *G02F 1/135* | (2006.01) |
| *G06F 17/00* | (2006.01) |
| *G06F 3/00* | (2006.01) |
| *G09G 3/36* | (2006.01) |
| *G02B 26/00* | (2006.01) |

(52) U.S. Cl.
USPC ............ 353/31; 353/121; 353/94; 348/750; 345/418; 345/87; 710/51; 349/30; 359/237

(58) Field of Classification Search
USPC ............ 353/31, 121, 94; 348/750; 362/620; 345/418, 87; 710/51; 349/30; 359/237
See application file for complete search history.

(56) References Cited

U.S. PATENT DOCUMENTS

| | | | |
|---|---|---|---|
| 4,945,489 A | | 7/1990 | Vahab |
| 5,788,352 A | * | 8/1998 | Montroy et al. ............. 353/30 |
| 7,033,056 B2 | | 4/2006 | Andersen et al. |
| 7,284,889 B2 | | 10/2007 | Andersen et al. |
| 7,623,791 B2 | | 11/2009 | Isumi |
| 2009/0153752 A1 | | 6/2009 | Silverstein |

* cited by examiner

*Primary Examiner* — Georgia Y Epps
*Assistant Examiner* — Magda Cruz
(74) *Attorney, Agent, or Firm* — Timothy M. Schaeberle

(57) ABSTRACT

An apparatus for forming a color image has at least a first, a second, and a third illumination source, each illumination source energizable to provide continuous illumination of a first, a second, or a third wavelength band, respectively, to an optical multiplexer. The optical multiplexer is actuable to cyclically switch received light from each one of the illumination sources, in turn, to each one of at least a first, a second, and a third projector channel in a repeated sequence. The first projector channel connects to a first projector apparatus, the second projector channel connects to a second projector apparatus, and the third projector channel connects to a third projector apparatus. Each projector apparatus has a light modulator that is energizable to form an image from the light of the first, second, or third wavelength band that is cyclically switched onto its projector channel from the optical multiplexer.

20 Claims, 8 Drawing Sheets

MULTI-PROJECTOR SYSTEM USING MULTIPLEXED ILLUMINATION

CROSS REFERENCE TO RELATED APPLICATIONS

Reference is made to, and priority is claimed from, U.S. Ser. No. 61/297,985, filed as a provisional patent application on Jan. 25, 2010, entitled, "MULTI-PROJECTOR SYSTEM USING MULTIPLEXED ILLUMINATION", in the name of Joshua M. Cobb and commonly assigned.

FIELD OF THE INVENTION

This invention generally relates to electronic color imaging and more particularly relates to an apparatus and method for sharing color illumination among multiple digital projectors.

BACKGROUND

In an electronic imaging apparatus, such as a digital projector, light from each of three or more spectral bands, conventionally Red, Green, and Blue (RGB), is modulated and the modulated light output is combined on a front- or rear-projection screen or other display surface in order to provide a color image. Earlier electronic imaging apparatus employed broadband lamps and other polychromatic illumination sources to provide the colored light in each color channel. More recent systems utilize narrow-band solid-state light sources, notably Light Emitting Diodes (LEDs) and lasers as illumination sources. Using solid-state light sources of these types, it became possible to reduce some of the size and cost of color mixing components, as well as to improve color gamut, to increase optical efficiency, and to enhance the overall performance of the imaging device.

Digital projection apparatus form images by directing the color illumination onto a spatial light modulator (SLM), including devices such as a Liquid Crystal on Silicon (LCoS) device or a micromirror array, such as the Digital Light Processor (DLP) from Texas Instruments, Inc., Dallas, Tex. Other types of SLM include scanned linear modulators such as the grating light valve (GLV) from Silicon Light Machines, Inc., Sunnyvale, Calif. The color image that is formed is a composite of individually modulated red, green, and blue images; each color image is separately modulated, either at an SLM that is dedicated to a particular red, green, or blue color channel as part of a three-channel system, or at a single SLM that is time-shared between the three color channels, in what is known as a color-sequential imaging sequence or field sequential imaging.

Among factors in the cost/performance tradeoff for digital projector design are brightness, image quality and color gamut, and component count. Predictably, image quality and brightness can be optimized using a more costly design with separate color channels, each having its own illumination source and SLM. The color-sequential projector, with only a single SLM and without the need for color combination components, can be made more affordable, but only offers a fraction of the brightness possible with the three-channel system.

In addition to alternative projector designs, a number of different projector configurations are known in the art, including applications that employ multiple digital projectors. One application of interest is a so-called stitched-image projection system in which each projector forms a separate image and the separately formed images are then combined or stitched together to form a larger image. This imaging technique enables a large scale, high-resolution image to be formed and has advantages for increased brightness and increased resolution over single-projector systems.

Stitched image projection systems can still be costly, however, since several separate projectors are needed with separate light sources for each projector. It can be seen that there would be benefits to a stitched image projection system that offered improved performance at reduced cost and with more efficient use of illumination components.

SUMMARY

It is an object of the present invention to advance the art of digital image projection. A related object is to provide more efficient and less costly ways to provide digital images in image stitching systems and other types of imaging systems that use multiple projectors. Advantageously, the apparatus and methods of the present invention allow enhancements in image brightness, allowing a multi-projector system having a lower parts count.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided an apparatus for forming a color image comprising:
   at least a first, a second, and a third illumination source, each illumination source energizable to provide a continuous illumination of a first, a second, or a third wavelength band, respectively, to an optical multiplexer;
   wherein the optical multiplexer is actuable to cyclically switch the received light from each one of the at least first, second, and third illumination sources, in turn, to each one of at least a first, a second, and a third projector channel in a repeated sequence;
   wherein the first projector channel connects to a first projector apparatus, the second projector channel connects to a second projector apparatus, and the third projector channel connects to a third projector apparatus,
   and wherein each projector apparatus comprises a light modulator that is energizable to form an image from the light of the first, second, or third wavelength band that is cyclically switched onto its projector channel from the optical multiplexer.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION

Figure 1:
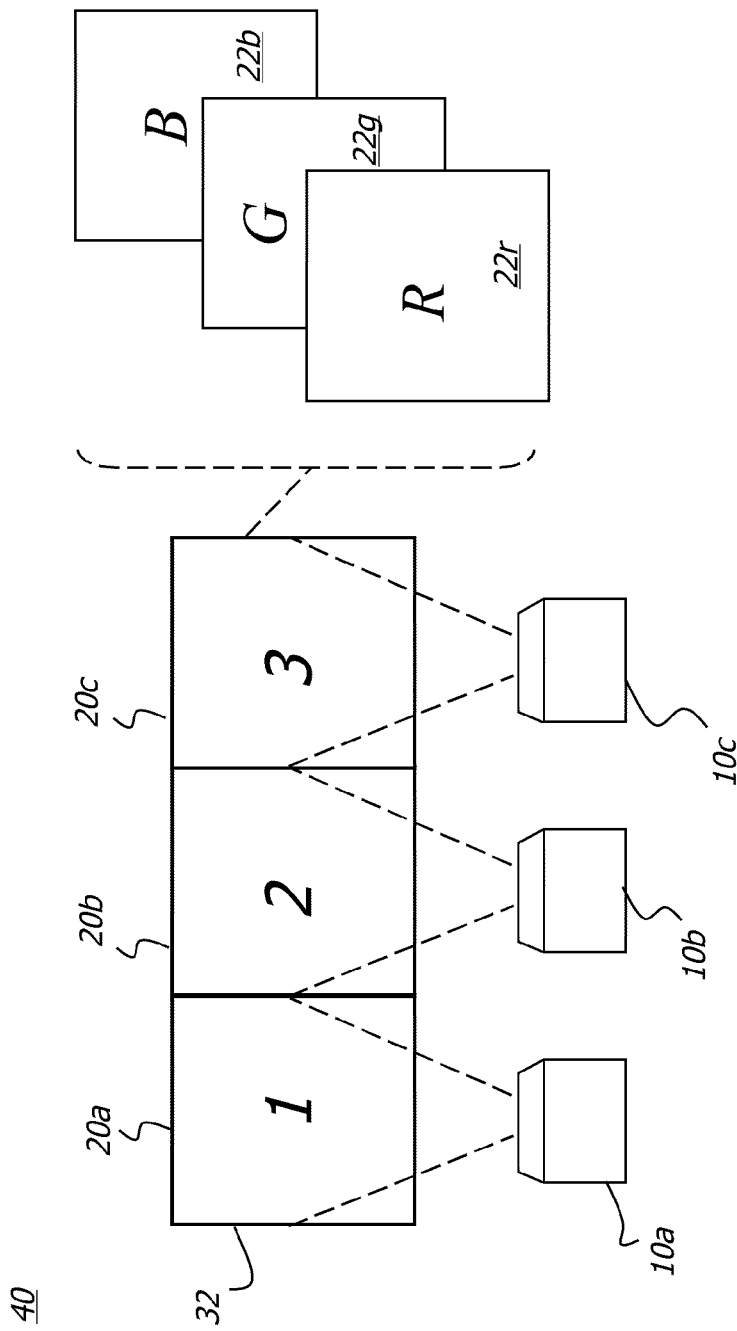
FIG. 1 is a schematic diagram showing a stitched image projection system.

Elements not specifically shown or described may take various forms well known to those skilled in the art. Figures shown and described herein are provided in order to illustrate key principles of operation and component relationships and timing according to representative embodiments of the present invention and are not drawn with intent to show actual size or scale. Some exaggeration may be necessary in order to emphasize basic structural relationships or principles of operation. Some conventional components that would be needed for implementation of the described embodiments, such as various types of supporting optical components, for example, are not shown in the drawings in order to simplify description of the invention itself. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another.

The terms "color" and "wavelength band" are generally synonymous as used in the context of the present disclosure. For example, a laser or other solid-state light source is referred to by its general color, such as red, rather than by its wavelength band (such as 630-640 nm) or nominal peak wavelength (such as 635 nm). The letters R, G, and B are used in text and figures to denote the red, green, and blue wavelength bands conventionally used for synthesis of a color image in electronic imaging apparatus. Lower case letters r, g, and b are appended to part numbers in figures and text to aid description and to more clearly distinguish the three color paths and their associated components.

The schematic diagram of FIG. 1 shows a stitched image projection system 40 using multiple projection apparatus. Three projectors 10a, 10b, and 10c form adjacent images 20a, 20b, and 20c, respectively, on a projection screen 32. As is represented for one of the images 20c, at the side of image 20c, each image 20a, 20b, and 20c is, in turn, formed as a composite image from three single-color component images, a red component image 22r, a green component image 22g, and a blue component image 22b.

Figure 2:
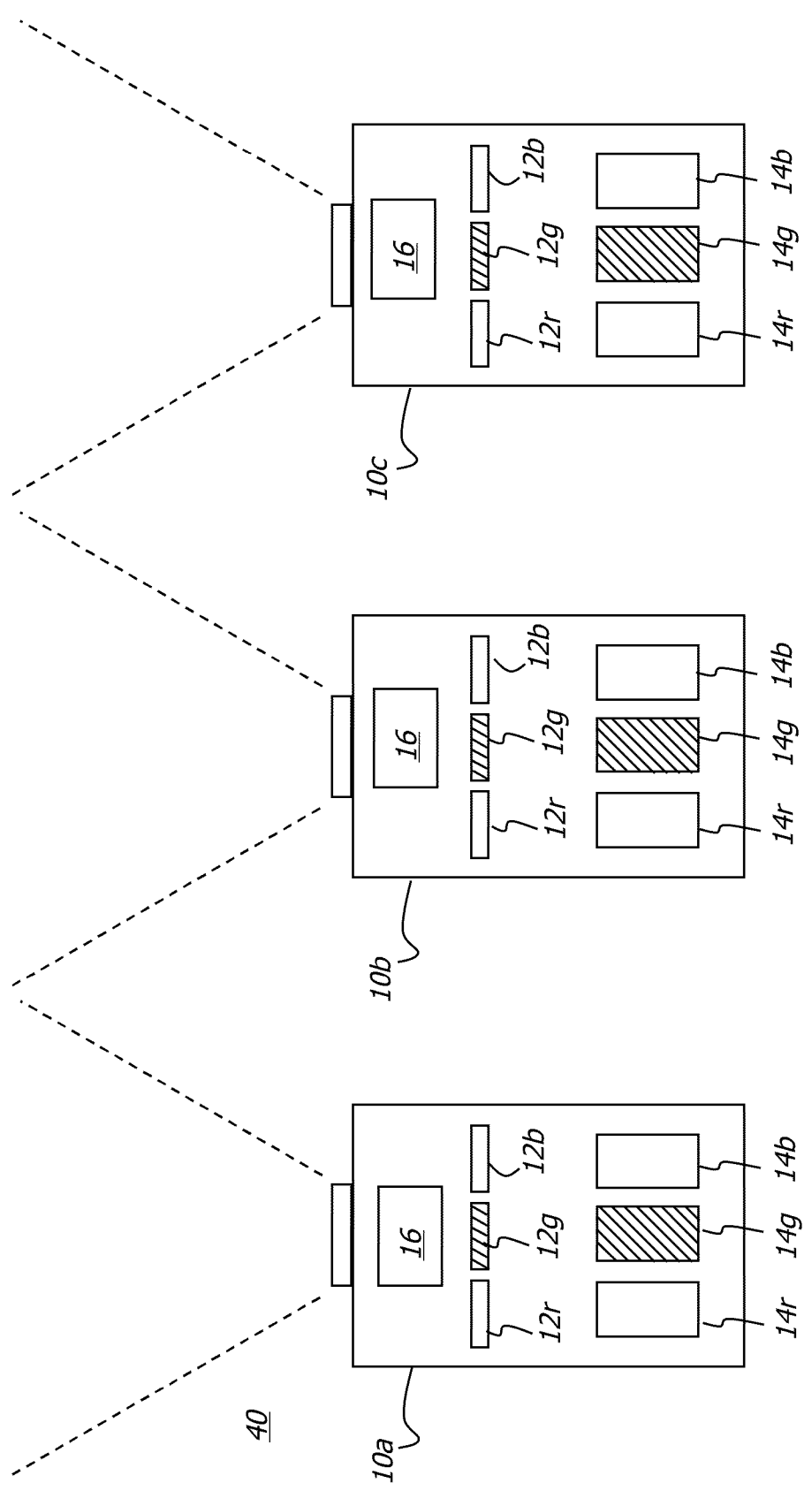
FIG. 2 is a schematic diagram that shows a conventional stitched image projection system using 3 channel projector apparatus.

The schematic diagram of FIG. 2 shows a conventional stitched image projection system 40 using projectors 10a, 10b, and 10c of the three-channel system type. Each projector 10a, 10b, and 10c has separate color channels, each with a corresponding light modulator 12r, 12g, and 12b, each energizable to form an image for red, green, and blue light modulation respectively. Each color channel has a corresponding illumination source 14r, 14g, and 14b, energizable to provide red, blue, and green illumination respectively. In an alternate embodiment, these separate color illumination sources could be generated by filtering the light from a single illumination source, such as a broadband arc lamp, for example, into three or more spectral components. As is true for three-channel projectors in general, a color combining element 16 is required in each of the projectors 10a, 10b, and 10c in order to combine the modulated light from component images onto an optical axis for projection as the composite color image. Color combining element 16 can be an X-cube, Philips prism, V-prism, or other structure using a combination of dichroic surfaces for redirecting modulated light from each color channel. For clarity and to simplify description of embodiments of the present invention, the schematic arrangement of each of projectors 10a, 10b, and 10c is not shown in detail in this or subsequent figures. For example, not explicitly shown in this or subsequent figures are a number of additional elements needed for forming and projecting the modulated image, such as projection optics, display surface, light integrator components for providing a more uniform illumination beam, scanner elements for linear light modulators, and various other elements necessary for forming the projected image. Such needed elements are familiar to those skilled in the digital image projection arts and vary depending on the type of SLMs and illumination sources that are used.

As can be appreciated by those familiar with digital projection, the three-channel embodiment of FIG. 2 can be considerably costly, since it requires three SLMs and three illumination sources in each of three projectors, along with the necessary support elements for modulating and combining the light from each color channel within each projector.

Figure 3:
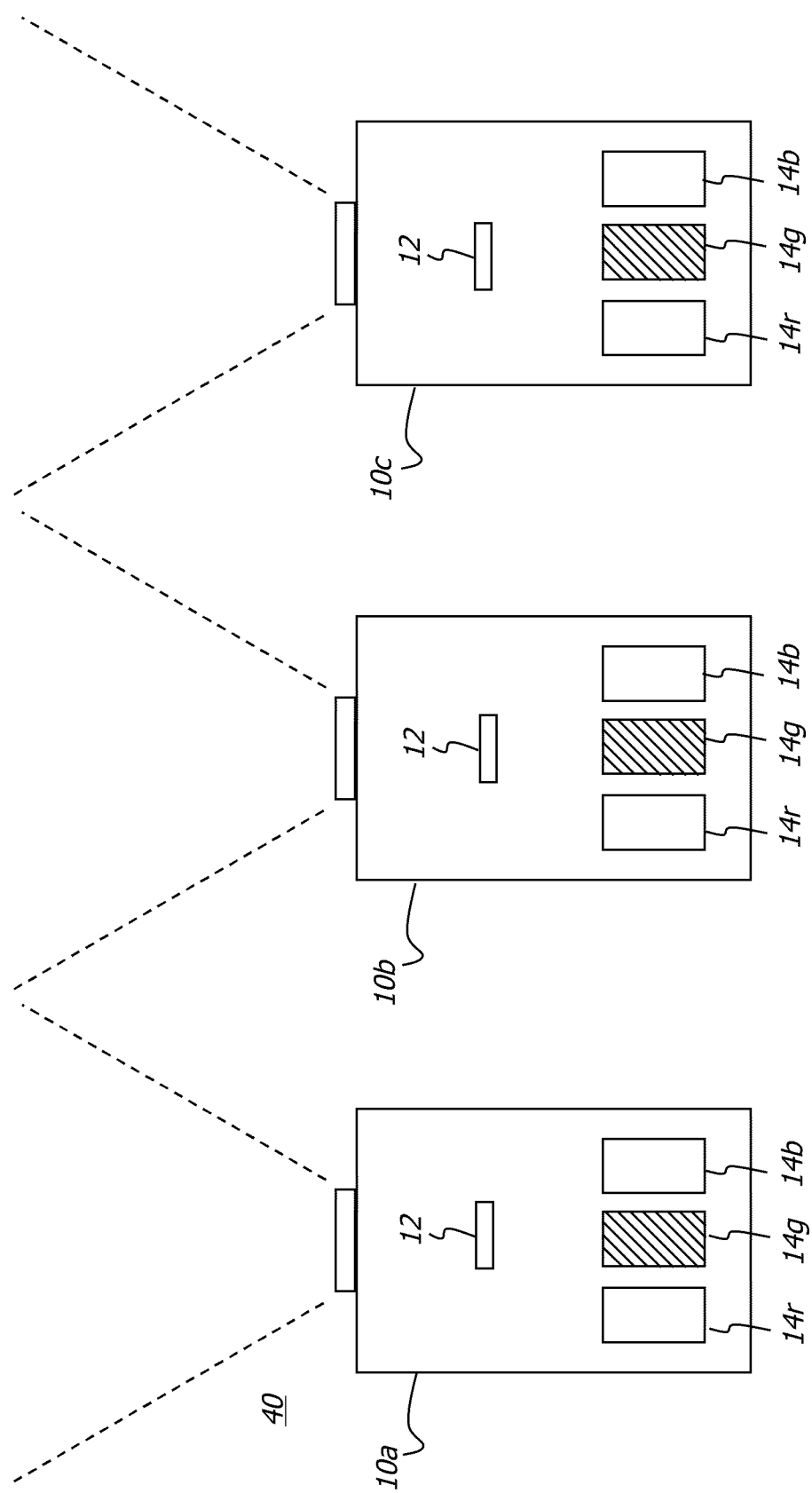
FIG. 3 is a schematic diagram that shows a conventional stitched image projection system using color-sequential imaging projector apparatus.

By comparison, the configuration of stitched image projection system 40 shown schematically in FIG. 3, using color-sequential imaging in projectors 10a, 10b, and 10c, is less costly and less complex than the parallel arrangement shown in FIG. 2. Only a single SLM 12 is needed in each projector and no color combining elements are required as with the three-channel projectors of FIG. 2. However, this cost savings represents a significant loss in brightness and somewhat reduced overall performance from each of projectors 10a, 10b, and 10c. In the FIG. 3 configuration, each projector 10a, 10b, and 10c still requires its own set of illumination sources 14r, 14g, and 14b for directing illumination to a spatial light modulator 12.

Figure 4:
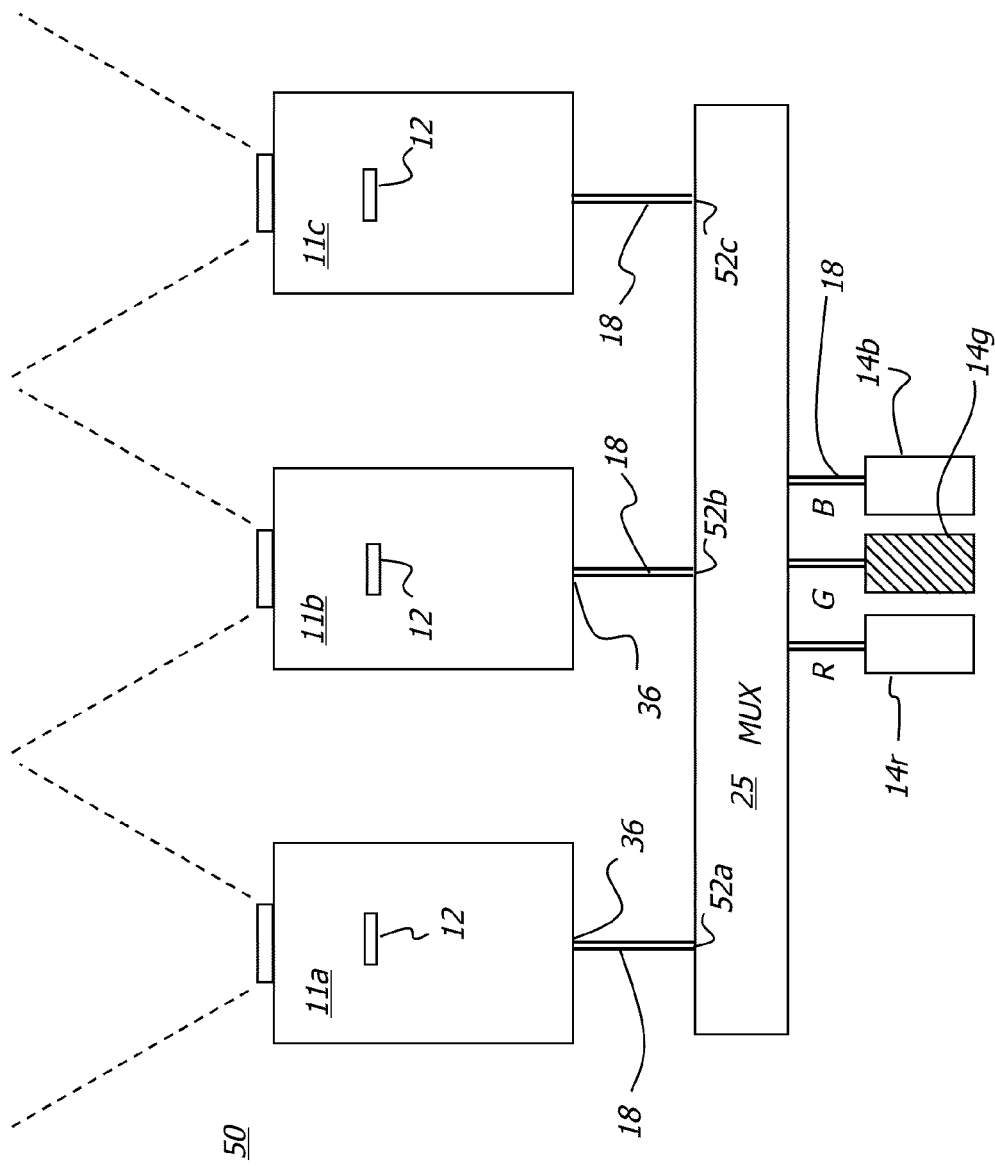
FIG. 4 is a schematic diagram that shows a stitched image projection system using multiple projection apparatus according to an embodiment of the present invention.

FIG. 4 is a schematic diagram that shows a stitched image projection system 50 using multiple projection apparatus according to an embodiment of the present invention. In this configuration, a single set of illumination sources 14r, 14g, and 14b is provided, not housed within a projector, but external to all of the projectors 11a, 11b, and 11c shown. Illumination sources 14r, 14g, and 14b are each directed to an optical multiplexer MUX 25 that is actuable to cyclically switch the illumination from each of the red, green, and blue illumination sources 14r, 14g, and 14b in sequence to projectors 11a, 11b, and 11c, as a color channel of externally supplied illumination. Each projector 11a, 11b, and 11c is of the color-sequential type and receives illumination of a single color at a time over a single projector channel, labeled 52a, 52b, and 52c, respectively. Each projector 11a, 11b, and 11c directs illumination it receives from an external source to a single spatial light modulator 12 that is energizable to form an image from the received light, using the illumination that is provided on the corresponding color channel, that is, on its projector channel, 52a, 52b, and 52c, respectively.

As is shown and described in more detail subsequently, the red, green, and blue illumination sources 14r, 14g, and 14b are used more efficiently with the FIG. 4 arrangement than with conventional projector apparatus, using either projectors with three independent color modulation channels as in FIG. 2, or with a single light modulation channel and three color sources as in FIG. 3. For color sequential projection, the FIG. 4 configuration significantly increases the light throughput due to the use of optical multiplexer 25. Light guides 18, such as multi-mode optical fibers, liquid light guides, or other capable low-loss light directing elements, provide the needed optical continuity for directing light on the switched color channel to one of the input ports 36 on the appropriate projector 11a, 11b, and 11c, as sequenced through multiplexer 25.

Figure 5:
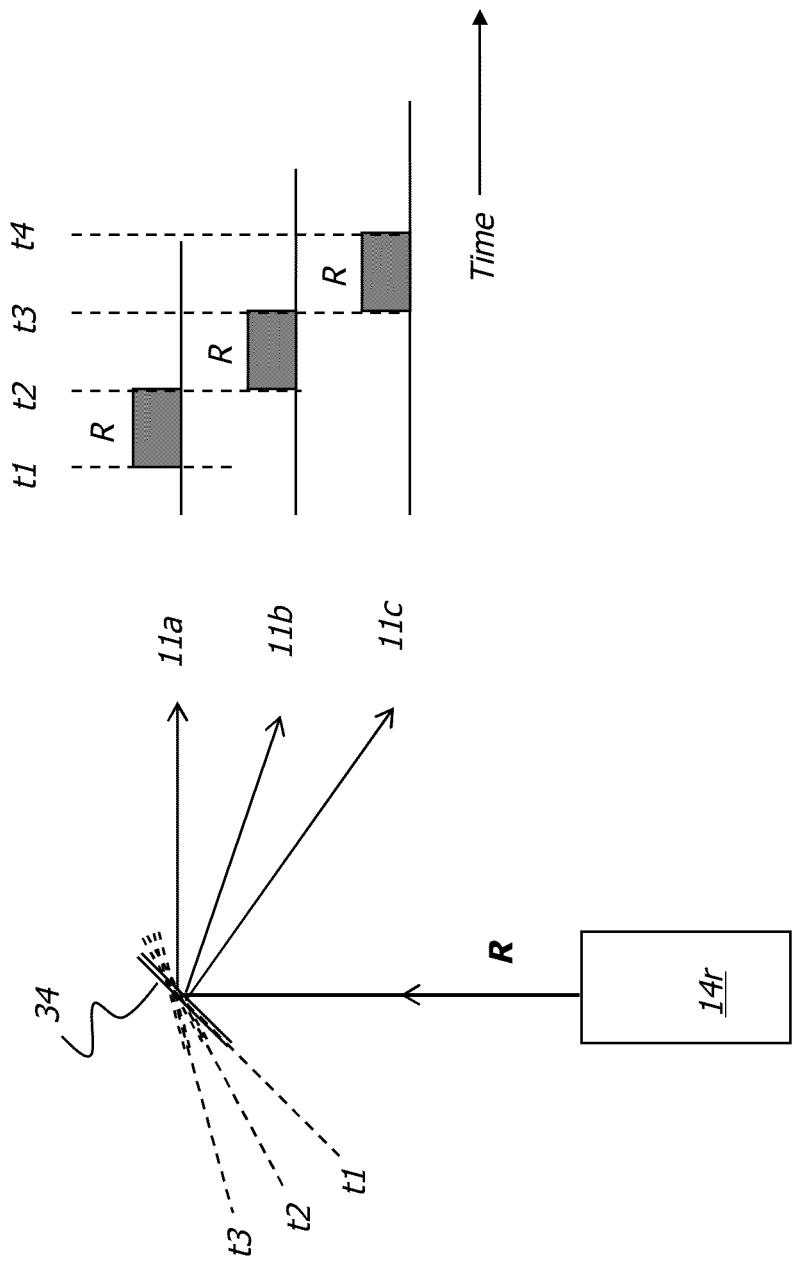
FIG. 5 is a schematic diagram showing the path of illumination and timing by the multiplexer in the Red color channel, for the embodiment of FIG. 4.

In order to illustrate what optical multiplexer 25 achieves as it is actuated to switch each color illumination beam, the schematic diagram of FIG. 5 shows the path of illumination and timing in the red color channel for the embodiment of stitched image projection system 50 in FIG. 4. Within multiplexer 25, illumination from energized red illumination source 14r is directed to a switching element 34, represented in FIG. 5 as a reflective surface that is rotatable to three positions. A timing chart is shown at the right in this figure, with times t1, t2, t3, and t4 at evenly spaced intervals. At time t1, switching element 34 directs red illumination along the projector channel (channel 52a in FIG. 4) to projector 11a. At time t2, switching element 34 rotates by an increment to direct the red illumination along the corresponding projector channel 52b to projector 11b. At time t3, switching element 34 rotates to direct the red illumination along the corresponding projector channel 52c to projector 11c. Using this switching sequence, illumination source 14r is not switched on and off, but remains on, continuously energized during projection system operation and exclusively directed, at any one time, to one of the projector channels. This eliminates the inefficiency, stabilization time, and component degradation that otherwise would occur if illumination source 14r were repeatedly switched on and off, as would be necessary for the color-sequential arrangement described previously with reference to FIG. 3.

Still referring to FIG. 5, the function performed by switching element 34 can be effected in a number of ways within optical multiplexer 25. Different switching technologies that can be used for switching light between the optical paths include micro-electromechanical systems (MEMS) devices, such as components that use a digital micromirror array or an optical grating array. Acousto-optical modulators (AOMs) and electro-optical modulators (EOM) could alternately be used within optical multiplexer 25.

As noted, one of the advantages in using MUX 25 for switching the same light source 14r to different projectors is that the light source itself is not switched repeatedly on and off, but remains on continuously during projector operation. Repeated on/off switching of solid-state or other light sources shortens component life. In addition, for some types of emissive devices, there may be an initial settling time needed, such as for wavelength stability, each time the device is turned on. The need for this settling time is eliminated by maintaining the light source in the energized state and sequentially switching the light source to different projectors as described with reference to FIGS. 4 and 5.

Figure 6:
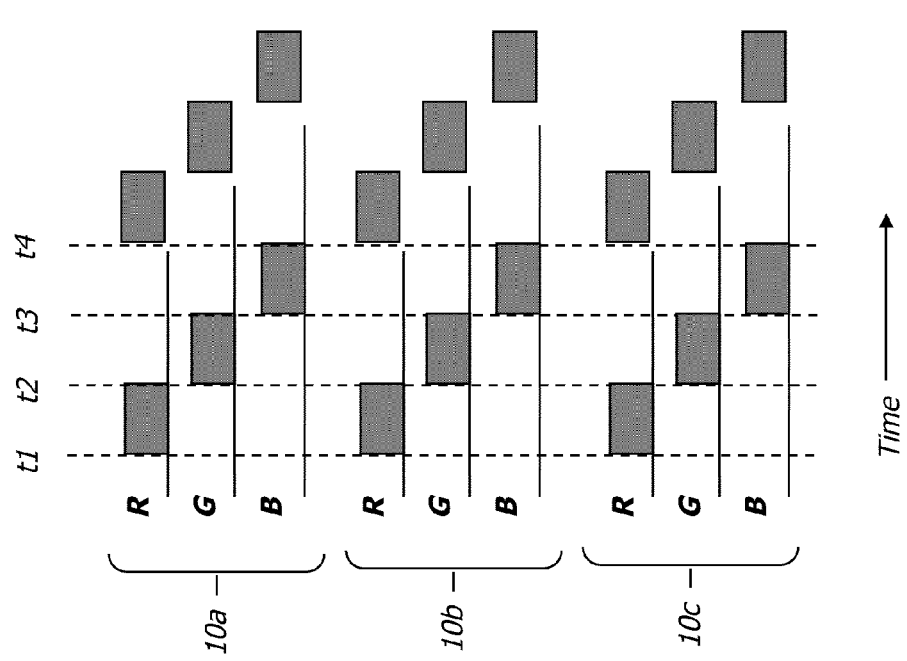
FIG. 6 is a timing diagram that shows a sequence of operation for a conventional stitched image projection system using color-sequential imaging projector apparatus as shown in FIG. 3.

Another significant advantage relates to efficiency and resulting brightness that can be achieved while using projectors of the color-sequential imaging type. This is readily shown by comparing the illumination timing of the conventional multi-projector system of FIG. 3 with the embodiment of the present invention of FIG. 4. The timing diagram of FIG. 6 shows a sequence of operation for a conventional stitched image projection system using color-sequential imaging projector apparatus as shown in FIG. 3. Here, considering illumination source 14r for projector 10a, red illumination is needed only ⅓ of the time; the other ⅔ of the potential light that would be available from this source would be unusable. Thus, either illumination source 14r is turned off when not needed in the illumination cycle, or the light is redirected and "dumped" to another location, requiring its absorption and causing some waste of energy due to the needed heat that is generated thereby. Considering the timing of illumination for each of projectors 10a, 10b, and 10c as shown in FIG. 6, this problem is encountered for each of the illumination sources 14r, 14g, and 14b in each of projectors 10a, 10b, and 10c. There is then, considerable inefficiency and loss of potential brightness in the conventional arrangement of stitched image projection system of FIG. 3.

Figure 7:
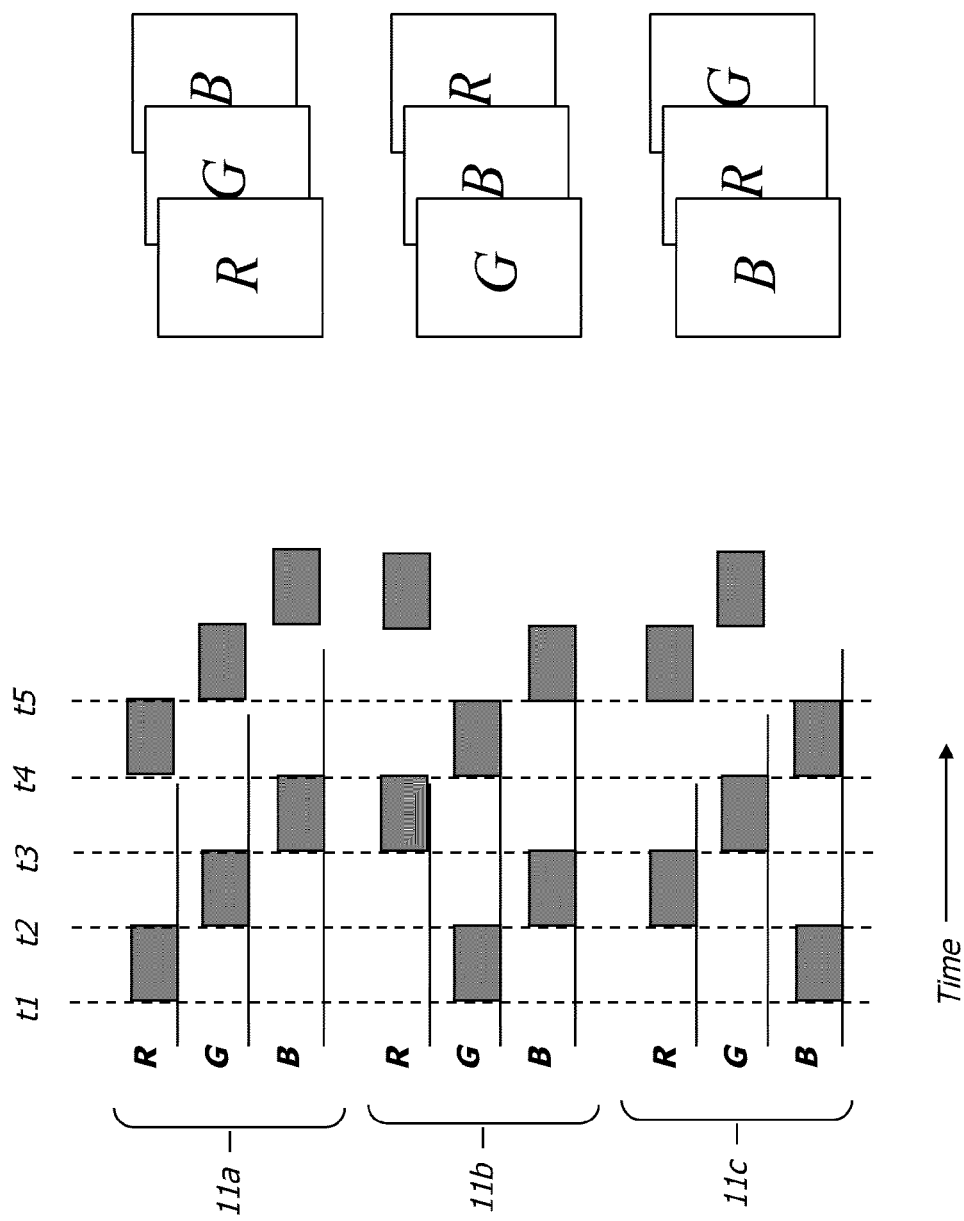
FIG. 7 is a timing diagram that shows a sequence of operation for a stitched image projection system using color-sequential imaging projector apparatus of an embodiment of the present invention as shown in FIG. 4.

Referring to the timing diagram of FIG. 7, there is shown a sequence of operation for a stitched image projection system using color-sequential imaging projectors 11a, 11b, and 11c of an embodiment of the present invention, as shown previously in FIG. 4. Considering first red illumination source 14r, it can be seen that its illumination is multiplexed or shared between each of projectors 11a, 11b, and 11c, provided separately to each projector channel during a different interval. During the interval between time t1 and t2, red illumination is switched to projector 11a. During the interval between time t2 and t3, red illumination from the same source is switched to projector 11c. During the interval between time t3 and t4, red illumination is switched to projector 11b. This switching cycle then repeats, so that, over any time interval, the red illumination from a single illumination source is used for providing light for modulation in one of the projectors 11a, 11b, and 11c. It can be observed from FIG. 7 that this same cyclical pattern is repeated for the illumination beam from illumination sources 11g and 11b. Thus, none of the illumination sources 14r, 14g, and 14b must be switched off during imaging; substantially all of the output light from these sources is used. Component life is not compromised by repeated on/off switching.

In the timing example of FIG. 7, recalling the single-color component images described previously with reference to FIG. 1, the first frame of the projected composite image from projector 11a is formed by a sequence of R, G, and B component images. The first frame of the projected composite image from projector 11b is formed by a sequence of G, B, and R component images. The first frame of the projected composite image from projector 11c is formed by a sequence of B, R, and G component images. Alternately, because the component images are formed and projected in a sequence that exceeds the detectable response of the human eye, such as more rapid than 30 times a second, for example, each of the composite images 20a, 20b, and 20c for the respective projectors 11a, 11b, and 11c can be formed as an ordered sequence of composite images in R-G-B sequence. If this timing is used, the composite images are staggered in time. With this alternate timing arrangement and using the example timing of FIG. 7, the full three-component color frame that forms the composite image from projector 11a would be generated and projected over the time period from t1 to t4; the full three-component color frame for the composite image from projector 11c, meanwhile, would be formed over the time period from t2 to t5. It can be appreciated that alternate ordered sequences, such as G-R-B, or B-R-G could similarly be used.

The timing sequences shown in FIGS. 6 and 7 use an equal ⅓ duty cycle timing for each illumination color. In practice, alternate duty cycles with different durations for the red, green, and blue colors could be used. However, the resulting efficiency would be limited by factors such as the time difference between longest and shortest time durations used for the respective color channels. Advantageously, the need to vary the duty cycle is reduced or eliminated using the apparatus and methods of the present invention. Providing different time intervals for any of the three illuminant colors has been a strategy previously used for added effective output from weaker light channels for some conventional color-sequential projectors. However, because only one illumination source for each waveband is shared between projectors, more powerful illumination sources can be used with embodiments of the present invention, eliminating or minimizing the need for varying the duty cycle.

Figure 8:
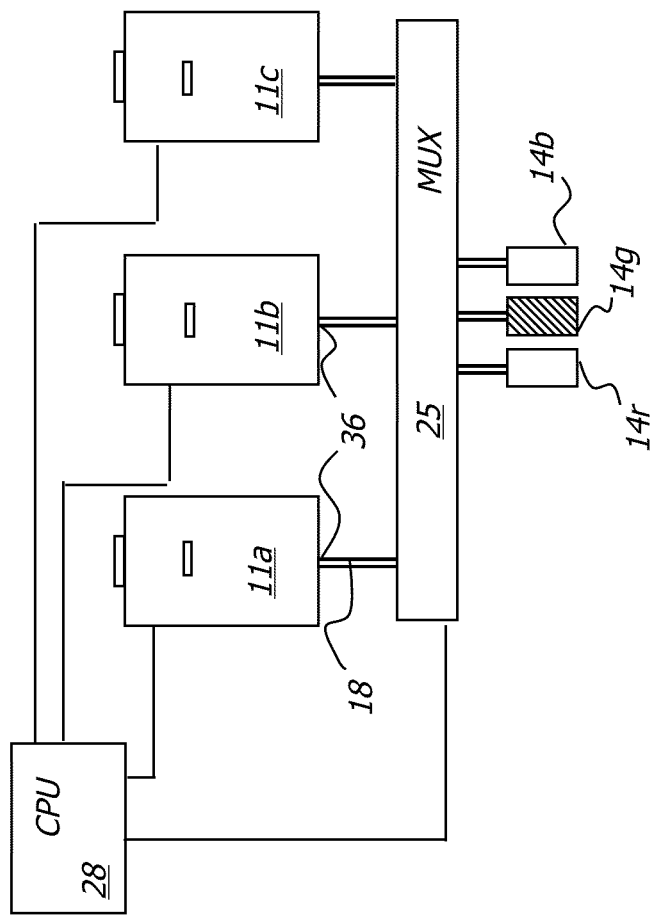
FIG. 8 is a schematic diagram that shows control logic interconnection for a stitched image projection system using color-sequential imaging projector apparatus of an embodiment of the present invention as shown in FIG. 4.

In order to implement the timing sequence of FIG. 7 for stitched image presentation, control logic and synchronization timing is required. FIG. 8 is a schematic diagram that shows control logic interconnection for a stitched image projection system using color-sequential imaging projector apparatus of embodiments of the present invention as shown in FIG. 4. In the FIG. 8 embodiment, each of projectors 11a, 11b, and 11c has a single input channel that serves as its projector channel. This corresponds to the single red, blue, or green color channel that is switched to the corresponding projector at one time by MUX 25. Alternately, any of projectors 11a, 11b, or 11c can have separate red, green, and blue inputs; this alternate arrangement enables use of existing color-sequential electronic projector designs in some cases.

A control processing unit 28, such as a computer, microprocessor, or other dedicated image processor and possibly including one or more networked processors, controls the timing with which image data are provided to each of projectors 11a, 11b, and 11c and the corresponding timing of switching for color channels that is performed by optical multiplexer 25. Stitched image algorithms for coordinating image projection and controlling how images are stitched together where they abut are also executed by control processing unit 28.

With the apparatus and methods of the present invention, there can be a significant reduction in parts count, packaging complexity, required size, and cost in projector design for stitched image and other multi-projector systems. This is largely because projectors 11a, 11b, and 11c in stitched image projection system 50 of the present invention (FIG. 4) do not require separate illumination sources, as is required with the conventional FIG. 3 arrangement for color-sequential projectors. Instead, each of projectors 11a, 11b, and 11c is adapted to receive illumination from the same external red, green, and blue illumination sources. One additional advantage this affords relates to heat generation within the projector, which can be a problem when packaging any type of solid-state or other light source with other components. The method and apparatus of the present invention remove this potential heat generating source from within the projector chassis. The problem of compensating for heat in surrounding components and in projection optics, for example, is also simplified. Where lasers are used, for example, a separate enclosure or chassis can be used for housing only the laser components, with heat management and cooling components suitably provided in one location, separate from the projector chassis.

The apparatus and methods of the present invention can be used with a number of types of illumination sources, including solid-state light sources such as LEDs and lasers. There can be particular advantages in using laser illumination, including high efficiency and brightness and improved color gamut over broadband light sources. Lasers of other non-solid-state types, such as gas, tunable dye, or fiber lasers could alternately be used.

While the description given hereinabove has focused on stitched image projection systems that provide a larger or panoramic image from three or more separately formed images displayed adjacently, it should be noted that this same apparatus and methods for switching illumination sources between projectors can be used for other types of multi-projector venues that form color images by front- or rear-projection. The images projected from the different projectors could be adjacent, overlaid, or separated from each other, for example.

Efficiency and brightness improvements are most pronounced for image projection systems when there is a 1:1 correspondence between the number of illumination colors that are used and the number of projectors in the system. The apparatus and methods of the present invention could be used for a four-color projection system, for example, such as one using red, green, blue, and yellow light where three or four projectors are provided. Projector apparatus with five or more colors could also be used. The number of colors must at least equal or exceed the number of projectors in order to benefit from improved brightness and efficiency.

The invention has been described in detail with particular reference to a presently preferred embodiment, but it is understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

Thus, what is provided is an apparatus and method for multiplexing illumination in an imaging system using solid-state light sources.

The invention claimed is:

1. An apparatus for forming a color image comprising:
   at least a first, a second, and a third illumination source, each illumination source energizable to provide a continuous illumination of a first, a second, and a third wavelength band, respectively, to an optical multiplexer;
   wherein the optical multiplexer is actuable to cyclically switch the received light from each one of the at least first, second, and third illumination sources, in turn, to each one of at least a first, a second, and a third projector channel in a repeated sequence;
   wherein the first projector channel connects to a first projector apparatus, the second projector channel connects to a second projector apparatus, and the third projector channel connects to a third projector apparatus,
   and wherein each projector apparatus comprises a light modulator that is energizable to form an image from the light of the first, second, or third wavelength band that is cyclically switched onto its projector channel from the optical multiplexer.

2. The apparatus of claim 1 wherein at least one of the at least first, second, and third illumination sources is a solid-state light source.

3. The apparatus of claim 1 wherein at least one of the at least first, second, and third illumination sources is a laser.

4. The apparatus of claim 1 wherein at least one of the at least first, second, and third illumination sources uses filtered light from a lamp.

5. The apparatus of claim 1 wherein the light modulator is taken from the group consisting of a digital micromirror array, a liquid-crystal device, and a scanned linear diffraction grating.

6. The apparatus of claim 1 wherein at least one of the at least first, second, and third projector channels comprise a light guide and wherein the light guide is taken from the group consisting of a fiber optic light guide and a liquid light guide.

7. The apparatus of claim 1 wherein the optical multiplexer comprises microelectromechanical elements for switching the received light to each of the at least first, second, and third projector channels.

8. The apparatus of claim 1 wherein the optical multiplexer comprises electro-optical or acoustic electro-optical elements for switching the received light to each of the at least first, second, and third projector channels.

9. An apparatus for forming a color image comprising:
   at least a first, a second, and a third illumination source, each illumination source energizable to provide a continuous illumination of a first, a second, and a third wavelength band respectively;
   at least a first, a second, and a third projector apparatus, each projector apparatus adapted to receive illumination provided from the at least first, second, and third illumination sources and each projector apparatus comprising a single light modulator that is energizable to form a composite color image comprising first, second, and third component images of the first, second, and third wavelength bands;
   and
   an optical multiplexer that is disposed to receive light from each of the first, second, and third illumination sources and that is actuable to cyclically switch the received light to each of the at least first, second, and third projector apparatus in a repeated sequence.

10. The apparatus of claim 9 wherein at least one of the at least first, second, and third illumination sources is a solid-state light source.

11. The apparatus of claim 9 wherein at least one of the at least first, second, and third illumination sources is a laser.

12. The apparatus of claim 9 wherein at least one of the at least first, second, and third illumination sources uses filtered light from a lamp.

13. The apparatus of claim 9 wherein the light modulator is taken from the group consisting of a digital micromirror array, a liquid-crystal device, and a scanned linear diffraction grating.

14. The apparatus of claim 9 wherein the optical multiplexer is connected to at least one of the at least first, second, and third projector apparatus by a light guide.

15. The apparatus of claim 14 wherein the light guide is taken from the group consisting of a fiber optic light guide and a liquid light guide.

16. The apparatus of claim 9 wherein the optical multiplexer comprises microelectromechanical elements for switching the received light to each of the at least first, second, and third projector apparatus.

17. The apparatus of claim 9 wherein the optical multiplexer comprises electro-optical or acousto-optical elements for switching the received light to each of the at least first, second, and third projector apparatus.

18. A method for forming color images comprising:
   a) energizing at least a first, a second, and a third illumination source to provide a continuous illumination of a first, a second, and a third wavelength band respectively; and
   b) executing a repeated sequence of projecting successive color images by:
      i) during a first time interval, simultaneously directing the illumination from the first illumination source to a first projector apparatus, the illumination from the second illumination source to a second projector apparatus, and the illumination from the third illumination source to a third projector apparatus;
      ii) during a second time interval, simultaneously directing the illumination from the first illumination source to the second projector apparatus, the illumination from the second illumination source to the third projector apparatus, and the illumination from the third illumination source to the first projector apparatus;
      iii) during a third time interval, simultaneously directing the illumination from the first illumination source to the third projector apparatus, the illumination from the second illumination source to the first projector apparatus, and the illumination from the third illumination source to the second projector apparatus.

19. The method of claim 18 wherein energizing at least the first, the second, and the third illumination source comprises energizing a laser.

20. The method of claim 18 wherein the first, second, and third projector apparatus project the successive color images as adjacent images onto a display surface.

* * * * *